United States Patent
Kawashima et al.

(10) Patent No.: US 11,822,168 B2
(45) Date of Patent: Nov. 21, 2023

(54) PHOTOCURABLE COMPOSITION AND LIQUID CRYSTAL DISPLAY DEVICE

(71) Applicant: Panasonic Intellectual Property Management Co., Ltd., Osaka (JP)

(72) Inventors: Keisuke Kawashima, Osaka (JP); Koso Matsuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 386 days.

(21) Appl. No.: 17/282,695

(22) PCT Filed: Sep. 30, 2019

(86) PCT No.: PCT/JP2019/038563
§ 371 (c)(1),
(2) Date: Apr. 2, 2021

(87) PCT Pub. No.: WO2020/095575
PCT Pub. Date: May 14, 2020

(65) Prior Publication Data
US 2021/0380747 A1 Dec. 9, 2021

(30) Foreign Application Priority Data
Nov. 6, 2018 (JP) .................................. 2018-209020

(51) Int. Cl.
*G02F 1/1333* (2006.01)
*C08G 18/00* (2006.01)
(Continued)

(52) U.S. Cl.
CPC .......... *G02F 1/1333* (2013.01); *C08F 283/10* (2013.01); *C08G 18/003* (2013.01);
(Continued)

(58) Field of Classification Search
CPC ...... C09K 2323/055; C09K 2323/0057; C08G 18/003; C08G 18/792; C08G 18/3876;
(Continued)

(56) References Cited

U.S. PATENT DOCUMENTS

| | | | |
|---|---|---|---|
| 2010/0152315 A1 | 6/2010 | Yamamoto et al. | |
| 2012/0095124 A1 | 4/2012 | Kirino | |
| 2014/0329926 A1* | 11/2014 | Kirino | C08G 59/66 |
| | | | 522/66 |

FOREIGN PATENT DOCUMENTS

| | | | | |
|---|---|---|---|---|
| CN | 103987754 | | 8/2014 | |
| CN | 112912413 B | * | 5/2023 | .......... C08F 283/006 |

(Continued)

OTHER PUBLICATIONS

International Search Report of PCT application No. PCT/JP2019/038563 dated Jan. 7, 2020.
(Continued)

*Primary Examiner* — Sophie Hon
(74) *Attorney, Agent, or Firm* — Wenderoth, Lind & Ponack, L.L.P.

(57) ABSTRACT

There is provided a photocurable composition including Component (A): epoxy compound, Component (B): acrylic ester compound, Component (C): isocyanate compound, Component (D): photobase generator, and Component (E): compound having a thiol group, in which Component (A) has two or more epoxy groups in one molecule, Component (B) has two or more acryloyl groups in one molecule, Component (C) has two or more isocyanate groups in one molecule, and Component (E) has two or more thiol groups in one molecule, and a ratio of a total mass of Component (A), Component (B), Component (C), and Component (D) to a mass of Component (E) is (Component (A)+Component (B)+Component (C)+Component (D)):Component (E)=74:26 to 20:80.

5 Claims, 1 Drawing Sheet

(51) Int. Cl.
| | |
|---|---|
| *C08F 283/10* | (2006.01) |
| *C08G 59/68* | (2006.01) |
| *C08G 59/66* | (2006.01) |
| *C08G 18/79* | (2006.01) |
| *C08L 63/00* | (2006.01) |
| *C08G 59/22* | (2006.01) |
| *C08G 18/38* | (2006.01) |

(52) U.S. Cl.
CPC ....... *C08G 18/3876* (2013.01); *C08G 18/792* (2013.01); *C08G 59/22* (2013.01); *C08G 59/66* (2013.01); *C08G 59/68* (2013.01); *C08L 63/00* (2013.01); *C09K 2323/055* (2020.08); *C09K 2323/057* (2020.08); *G02F 2202/28* (2013.01)

(58) Field of Classification Search
CPC ........ C08G 59/22; C08G 59/66; C08G 59/68; C08F 283/10; C08L 63/00; G02F 2202/28
See application file for complete search history.

(56) References Cited

FOREIGN PATENT DOCUMENTS

| JP | 2017-088825 | 5/2017 | |
| JP | 7199008 B2 * | 1/2023 | .......... C08F 283/006 |
| WO | 2007/040209 | 4/2007 | |
| WO | 2010/147161 | 12/2010 | |
| WO | 2013/089100 | 6/2013 | |

OTHER PUBLICATIONS

Extended European Search Report dated Nov. 9, 2021 in corresponding European Patent Application No. 19881049.1.
David Perrot et al., "UV-Curable Thio-Ether-Urethane Network with Tunable Properties", Journal of Polymer Science Part A: Polymer Chemistry, Jun. 27, 2016, vol. 54, No. 19, pp. 3119-3126, XP055668034.
English Translation of Chinese Search Report dated Jun. 15, 2022 for the related Chinese Patent Application No. 201980070513.0.

* cited by examiner

PHOTOCURABLE COMPOSITION AND LIQUID CRYSTAL DISPLAY DEVICE

TECHNICAL FIELD

The present invention relates to a photocurable composition and a liquid crystal display device including a cured product thereof.

BACKGROUND ART

An optically transparent adhesive is used for the purpose of adhering constituent members of the liquid crystal display device and improving the visibility of an image displayed on the liquid crystal display device. This transparent adhesive is mainly a photocurable composition that cures the members from a liquid to a solid by irradiation with light. Among the photocurable compositions, a photoradical polymerization composition using a radical species generated by decomposition by light as a reaction initiator is widely used.

However, the photoradical polymerization composition exhibits a large shrinkage of a cured product. In addition, in the photoradical polymerization composition, radicals which are active species that initiate a curing reaction by oxygen in the air can be captured, and the polymerization reaction can be inhibited. If the polymerization reaction is inhibited, there is a concern that poor curing may be caused. Therefore, it is necessary to take measures to block oxygen during the curing reaction.

On the other hand, as a photocurable material system in which the polymerization reaction is not inhibited by oxygen, the development of a photocationic polymerization composition is also widely performed. However, since the polymerization reaction initiator of the photocationic polymerization composition generates a strong acid by irradiation with light, corrosion and yellowing of the cured product and peripheral members thereof due to the strong acid become a problem. In addition, the photocationic polymerization composition does not inhibit the polymerization reaction by oxygen, but there is inhibition by moisture. Therefore, it is necessary to take measures to block moisture.

Under this background, attention is paid to a photoanionic polymerization composition using a photobase generator, which is a base in which the polymerization reaction is not inhibited by oxygen or moisture, the shrinkage of the cured product is small, and the reaction initiator does not cause problems such as corrosion or yellowing by irradiation with light, as a reaction initiator.

For example, there is disclosed a photocurable composition, which contains a photobase generator, can be rapidly cured at room temperature or a low heating temperature by irradiation with active energy rays such as light, has excellent storage stability, and contains an epoxy resin as a main component (refer to PTL 1). In addition, there is disclosed a photocurable composition that is a two-step curing type composition, which contains a photobase generator and performs heat-curing after light irradiation, and contains an epoxy resin with improved low-temperature curability, storage stability, and adhesive strength as a main component (refer to PTL 2).

CITATION LIST

Patent Literature

PTL 1: International Publication No. 2013/089100
PTL 2: Japanese Unexamined Patent Publication No. 2017-88825

SUMMARY OF THE INVENTION

According to an aspect of the present invention, there is provided a curable composition including:
  Component (A): epoxy compound, Component (B): acrylic ester compound, Component (C): isocyanate compound, Component (D): photobase generator, and Component (E): compound having a thiol group,
  in which Component (A) has two or more epoxy groups in one molecule,
  Component (B) has two or more acryloyl groups in one molecule,
  Component (C) has two or more isocyanate groups in one molecule, and
  Component (E) has two or more thiol groups in one molecule, and
  a ratio of a total mass of Component (A), Component (B), Component (C), and Component (D) to a mass of Component (E) is (Component $(A)$+Component $(B)$+Component $(C)$+Component $(D)$):Component $(E)$=74:26 to 20:80.

DESCRIPTION OF EMBODIMENT

Figure 1:
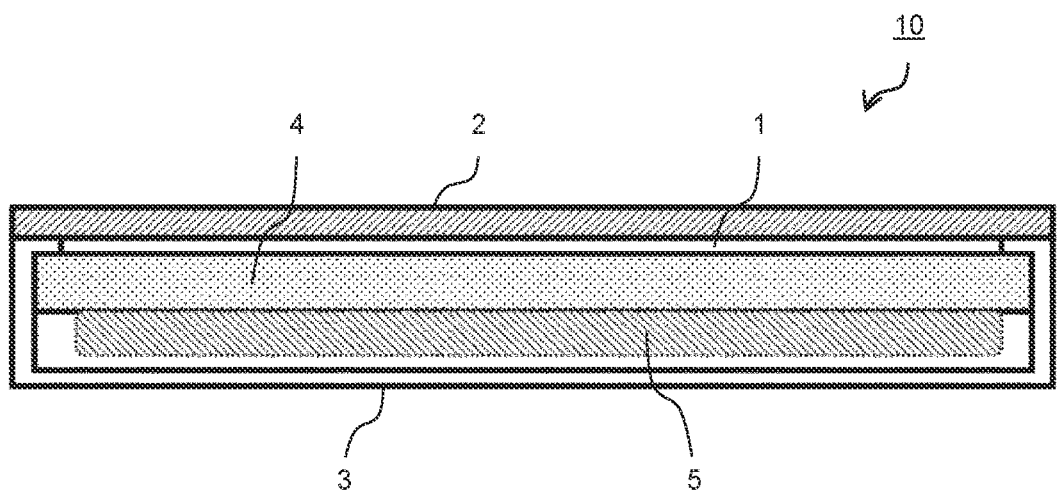
FIG. 1 is a schematic cross-sectional view of a liquid crystal display device according to an embodiment of the present invention.

The photocurable composition of PTL 1 is cured at room temperature or a low heating temperature, specifically 90° C. after light irradiation. However, in a case where this photocurable composition is cured at room temperature, it is necessary to add a large amount of a photobase generator. Specifically, it is said that it is necessary to add about 4 parts by mass of a photobase generator with respect to 100 parts by mass of the epoxy resin in the composition, which poses a problem in terms of cost. On the other hand, in a case where the photocurable composition is cured at 90° C., there is a problem in that the photocurable composition cannot be used for heat-sensitive members, and available uses of the photocurable composition are limited. In addition, the storage stability of the photocurable composition of PTL 1 is determined on the basis that the photocurable composition is not gelated at room temperature for 30 days or more. Accordingly, since the specific rate of change in viscosity is not clear, the practical storage stability in consideration of a case where the photocurable composition is actually applied is likely to be low.

Similar to the above description, there is a problem in that the photocurable composition of PTL 2 also requires the addition of a large amount of a photobase generator in order to be cured, and requires heating at 100° C. for curing after light irradiation. In addition, regarding the storage stability of the photocurable composition, the evaluation standard is that the viscosity does not exceed 120% of the initial viscosity in 3 months or more in an atmosphere of −20° C. However, according to such evaluation standard, the viscosity increase of 120% is large in the first place, and there is also a case where the photocurable composition cannot be suitably applied, and thus the practical storage stability is uncertain.

As described above, considering the case of being actually applied, the conventional photocurable composition containing a photobase generator does not have curing reactivity and storage stability which are considered to be practically suitable.

An object of the present invention is to provide a photocurable composition having excellent curing reactivity and high storage stability, and a liquid crystal display device including a cured product thereof and having excellent optical properties.

In a photocurable composition including Component (A): epoxy compound, Component (B): acrylic ester compound, Component (C): isocyanate compound, Component (D): photobase generator, and Component (E): compound having a thiol group, a ratio of the total mass of Components (A) to (D) to the mass of Component (E) is adjusted to be within a specific range, and addition amounts of Components (B) and (C), which have different reactivity from that of Component (A), are optionally appropriately selected in order to supplement the reactivity of Components (A) to (E). With this, it was recognized that the addition amount of Component (D) can be reduced. According to such a photocurable composition, it was recognized that the storage stability was improved and excellent curing reactivity was exhibited.

According to a first gist of the present invention, there is provided a curable composition including:

Component (A): epoxy compound, Component (B): acrylic ester compound, Component (C): isocyanate compound, Component (D): photobase generator, and Component (E): compound having a thiol group, Component (A) has two or more epoxy groups in one molecule, Component (B) has two or more acryloyl groups in one molecule, Component (C) has two or more isocyanate groups in one molecule, Component (E) has two or more thiol groups in one molecule, and a ratio of a total mass of Component (A), Component (B), Component (C), and Component (D) to a mass of Component (E) is (Component ($A$)+Component ($B$)+Component ($C$)+Component ($D$)):Component ($E$)=74:26 to 20:80.

According to an aspect of the first gist of the present invention, Component (B) includes at least one selected from the group consisting of acrylic ester compounds having one or more of an aliphatic structure and an aromatic structure in a side chain of an ester, and the photocurable composition includes Component (B) in a range of 3 parts by mass or more and 20 parts by mass or less in a case where the total sum of Component (A), Component (B), Component (C), Component (D), and Component (E) is set to 100 parts by mass.

According to one of the above aspects of the first gist of the present invention, Component (C) includes at least one selected from the group consisting of isocyanate compounds having one or more of an aliphatic structure and an aromatic structure in a main chain, and the photocurable composition includes Component (C) in a range of 3 parts by mass or more and 20 parts by mass or less in a case where the total sum of Component (A), Component (B), Component (C), Component (D), and Component (E) is set to 100 parts by mass.

According to one of the above aspects of the first gist of the present invention, Component (D) includes at least one selected from the group consisting of a carboxylate having either a xanthone skeleton or a ketoprofen skeleton, a salt containing a borate anion, a quaternary ammonium salt, and a carbamate compound.

According to a second gist of the present invention, there is provided a liquid crystal display device including a cured product of the photocurable composition of the first gist of the present invention.

According to the present invention, there is provided a photocurable composition having excellent curing reactivity and high storage stability, and a liquid crystal display device including a cured product thereof and having excellent optical properties.

Hereinafter, embodiments of the present invention will be described with reference to the drawings, but the present invention is not limited to such embodiments.

Hereinafter, the photocurable composition according to the embodiment of the present invention will be described in detail.

<Photocurable Composition>

The photocurable composition according to the embodiment of the present invention includes Component (A): epoxy compound, Component (B): acrylic ester compound, Component (C): isocyanate compound, Component (D): photobase generator, and Component (E): compound having a thiol group. Hereinafter, each component will be described in detail.

[Component (A): Epoxy Compound]

The epoxy compound of Component (A) is not particularly limited as long as the epoxy compound is a compound having two or more epoxy groups in one molecule. The epoxy compound of Component (A) has, for example, 2 or more and 5 or less epoxy groups, particularly 2 or more and 4 or less epoxy groups, and more particularly 2 or more and 3 or less epoxy groups in one molecule.

In addition, the epoxy compound of Component (A) may include at least one selected from the group consisting of an aliphatic structure and an aromatic structure in the main chain. The epoxy compound of Component (A) particularly has an aliphatic structure in the main chain, and more particularly has an alicyclic structure in the main chain. In addition, Component (A) includes at least one selected from the group consisting of an epoxy compound having an aliphatic structure in the main chain, an epoxy compound having an aromatic structure in the main chain, and an epoxy compound having an aliphatic structure and an aromatic structure in the main chain.

In the present disclosure, the "aliphatic structure" refers to a structure having an intercarbon bond and forming a linear structure, a branched structure, or an alicyclic structure, and does not include an aromatic structure. In the present disclosure, the "aromatic structure" refers to a structure having an intercarbon bond, having an sp2 hybrid orbital, and forming a cyclic unsaturated organic compound, and also includes a polycyclic aromatic structure and a complex aromatic structure. In the present disclosure, the "main chain" means the most continuous carbon chain, and in the case of an epoxy compound, an acrylic ester compound and an isocyanate compound, the main chain means a chain having an epoxy structure, an ester structure, and an isocyanate structure, respectively. In the present disclosure, the "side chain" refers to a portion of a carbon chain branched from the main chain. In addition, in the present disclosure, the terms "intercarbon bond" and "carbon chain" may include a heteroatom such as an oxygen atom or a nitrogen atom between the words, depending on the case.

The epoxy compound of Component (A) is not limited, and for example, bisphenol-based epoxy resins such as bisphenol A type epoxy resin, bisphenol F type epoxy resin, bisphenol S type epoxy resin, hydrogenated bisphenol A type epoxy resin, and hydrogenated bisphenol F type epoxy resin, biphenyl type epoxy resin having biphenyl skeleton, naphthalene ring-containing epoxy resin, anthracene ring skeleton-containing epoxy resin, alicyclic epoxy resin, dicyclopentadiene type epoxy resin having dicyclopentadiene skeleton, phenol novolac type epoxy resin, cresol novolac type epoxy resin, triphenylmethane type epoxy resin, brom-containing epoxy resin having aromatic structure and/or alicyclic structure, aliphatic epoxy resin having alicyclic structure in skeleton, aliphatic polyether epoxy resin having alicyclic structure, triglycidyl isocyanurate, and the like can be used. Alternatively, two or more of these resins may be used in combination.

In particular, as the epoxy compound of Component (A), an epoxy resin having an alicyclic structure such as trimethylolpropane triglycidyl ether, pentaerythritol tetraglycidyl ether, and dicyclopentadiene diglycidyl ether can be used.

The epoxy equivalent of the epoxy compound of Component (A) is, for example, 90 (g/eq) or more and 240 (g/eq) or less, particularly 110 (g/eq) or more and 220 (g/eq) or less, and more particularly 130 (g/eq) or more and 190 (g/eq) or less, and further more particularly 130 (g/eq) or more and 170 (g/eq) or less. In the present disclosure, the epoxy equivalent is measured according to the method described in JIS K-7236.

In the photocurable composition according to the embodiment of the present invention, in a case where the entirety (Component (A)+Component (B)+Component (C)+Component (D)+Component (E)) is set to 100 parts by mass, Component (A) is included particularly in a range of 10 parts by mass or more and 70 parts by mass or less, more particularly in a range of 12 parts by mass or more and 65.7 parts by mass or less, and further more particularly in a range of 15 parts by mass or more and 65.7 parts by mass or less. By including Component (A) in an amount of about 10 parts by mass or more, appropriate curing of the photocurable composition becomes possible. By including Component (A) in an amount of about 70 parts by mass or less, including other components such as Component (B) described later in an appropriate amount becomes possible, and the photocurable composition exhibits excellent curing reactivity and high storage stability.

[Component (B): Acrylic Ester Compound]

The acrylic ester compound of Component (B) is not particularly limited as long as the acrylic ester compound is a compound having two or more acryloyl groups in one molecule. The acrylic ester compound of Component (B) has, for example, 2 or more and 6 or less acryloyl groups, 2 or more and 4 or less acryloyl groups, and 2 or more and 3 or less acryloyl groups in one molecule.

In addition, the acrylic ester compound of Component (B) may include at least one selected from the group consisting of an aliphatic structure and an aromatic structure in the side chain of an ester. The compound of Component (B) particularly has an aliphatic structure in the side chain of an ester. In addition, Component (B) includes at least one selected from the group consisting of an acrylic ester compound having an aliphatic structure on the side chain of an ester, an acrylic ester compound having an aromatic structure on the side chain of an ester, and an acrylic ester compound having an aliphatic structure and an aromatic structure on the side chain of an ester.

The acrylic ester compound of Component (B) is not limited, and for example, ethylene glycol diacrylate, propanediol diacrylate, trimethylolpropane triacrylate, pentaerythritol tetraacrylate, dipentaerythritol hexaacrylate, which have an aliphatic ester structure, tricyclodecanedimethanol diacrylate having an alicyclic structure as an ester side chain, ethoxylated bisphenol A diacrylate having an aromatic structure as an ester side chain, and the like can be used. Alternatively, two or more of these acrylic ester compounds may be used in combination.

In the photocurable composition according to the embodiment of the present invention, in a case where the entirety (Component (A)+Component (B)+Component (C)+Component (D)+Component (E)) is set to 100 parts by mass, Component (B) is included particularly in a range of 3 parts by mass or more and less than 25 parts by mass, more particularly in a range of 3 parts by mass or more and 20 parts by mass or less, further more particularly in a range of 3 parts by mass or more and 15 parts by mass or less, even further more particularly in a range of 3 parts by mass or more and 10 parts by mass or less, and more, and more particularly in a range of 5 parts by mass or more and 10 parts by mass or less. By including Component (B) in an amount of 3 parts by mass or more, the photocurable composition can sufficiently react at the time of light irradiation and exhibits reliable curing characteristics. On the other hand, if highly reactive Component (B) is excessively included, an increase in the viscosity of the photocurable composition is likely to be caused. Therefore, by including Component (B) in an amount of less than 25 parts by mass, particularly 20 parts by mass or less, it is possible to reliably prevent a decrease in storage stability of the photocurable composition due to an increase in the viscosity.

[Component (C): Isocyanate Compound]

The isocyanate compound of Component (C) is not particularly limited as long as the isocyanate compound is a compound having two or more isocyanate groups in one molecule. The isocyanate compound of Component (C) has, for example, 2 or more and 6 or less isocyanate groups, 2 or more and 4 or less isocyanate groups, and 2 or more and 3 or less isocyanate groups in one molecule.

In addition, the isocyanate compound of Component (C) includes at least one selected from the group consisting of an aliphatic structure and an aromatic structure in the main chain. The compound of Component (C) has an aliphatic structure in the main chain, in particular. In addition, Component (C) includes at least one selected from the group consisting of an isocyanate compound having an aliphatic structure in the main chain, an isocyanate compound having an aromatic structure in the main chain, and an isocyanate compound having an aliphatic structure and an aromatic structure in the main chain.

The isocyanate compound of Component (C) is not limited, and for example, hexamethylene diisocyanate having an aliphatic structure in the main chain, isophorone diisocyanate having an alicyclic structure in the main chain, tolylene diisocyanate having an aromatic structure, and the like can be used. Alternatively, two or more of these isocyanate compounds may be used in combination.

In the photocurable composition according to the embodiment of the present invention, in a case where the entirety (Component (A)+Component (B)+Component (C)+Component (D)+Component (E)) is set to 100 parts by mass, Component (C) is included particularly in a range of 3 parts by mass or more and less than 25 parts by mass, more particularly in a range of 3 parts by mass or more and 20 parts by mass or less, further more particularly in a range of 3 parts by mass or more and 15 parts by mass or less, even further more particularly 3 parts by mass or more and 10 parts by mass or less, and more particularly in a range of 5 parts by mass or more and 10 parts by mass or less. By including Component (C) in an amount of 3 parts by mass or more, the photocurable composition can sufficiently react at the time of light irradiation and exhibits reliable curing characteristics. On the other hand, if the highly reactive component (C) is excessively included, an increase in the viscosity of the photocurable composition is likely to be caused. Therefore, by including Component (C) in an amount of less than 25 parts by mass, particularly in an amount of 20 parts by mass or less, it is possible to reliably prevent a decrease in storage stability of the photocurable composition due to an increase in the viscosity.

[Component (D): Photobase Generator]

The photobase generator of Component (D) is not particularly limited as long as the photobase generator is a compound that is decomposed by light irradiation, for example, ultraviolet ray irradiation to generate a basic compound.

The photobase generator of Component (D) includes at least one selected from the group consisting of a carboxylate having either a xanthone skeleton or a ketoprofen skeleton, a salt containing a borate anion, a quaternary ammonium salt, and a carbamate compound. For example, in a case where one or more of salts containing a carboxylate having either a xanthone skeleton or a ketoprofen skeleton and a borate anion are used as the photobase generator of Component (D), a strong base such as amidine, guanidine, and phosphazene, which is contained as a counter cation, can be generated. Due to the generation of a strong base, hydrogen is extracted from the thiol compound of Component (E) described later, and the reaction with the epoxy compound and the like of Component (A) proceeds rapidly. As a result, the photocurable composition has excellent reaction efficiency and has more excellent curing characteristics.

Among the photobase generators of Component (D), (2-(9-oxosanten-2-yl) propionic acid 1,5,7-triazabicyclo [4,4,0] deca-5-ene)), 2-(9-oxoxanthene-2-yl) propionic acid 1,8-diazabicyclo [5.4.0] undeca-7-ene, 1,2-dicyclohexyl-4,4,5,5-tetramethyldiguadium n-butyltriphenylborate, 1,2-disopropyl-3-[bis(dimethylamino) methylene] guanidinium 2-(3-benzoylphenyl) propinate, which are particularly excellent in reactivity of generating a strong base, can be used.

In the photocurable composition according to the embodiment of the present invention, in a case where the entirety (Component (A)+Component (B)+Component (C)+Component (D)+Component (E)) is set to 100 parts by mass, Component (D) is included particularly in a range of 0.1 parts by mass or more and less than 2 parts by mass, more particularly in a range of 0.2 parts by mass or more and 1 part by mass or less, further more particularly in a range of 0.2 parts by mass or more and 0.5 parts by mass or less, and even more particularly in a range of 0.2 parts by mass or more and 0.3 parts by mass or less, or more particularly in an amount of about 0.3 parts by mass. In a case where Component (D) is included in an amount less than 0.1 parts by mass, the amount of the base generated by light irradiation becomes small, which is likely to be insufficient to cure the photocurable composition. On the other hand, in a case where Component (D) is included in an amount of more than 2 parts by mass, the amount of free base remaining in the photocurable composition increases, and the storage stability of the photocurable composition is likely to be impaired. As described above, in the photocurable composition according to the embodiment of the present invention, the addition of the photobase generator may be relatively small, which is advantageous in terms of cost.

[Component (E): Compound Having a Thiol Group]

The compound having a thiol group of Component (E) is not particularly limited as long as the compound is a compound having two or more thiol groups in one molecule. The compound having a thiol group of Component (E) has, for example, 2 or more and 6 or less thiol groups, 3 or more and 6 or less thiol groups, and 3 or more and 4 or less thiol groups in one molecule.

In addition, the compound having a thiol group of Component (E) is, in particular, a compound that does not have a thioglycolic acid structure which is an acid component in the molecule. More particularly, the compound of Component (E) has a structure in which the thiol group is a secondary thiol.

The compound having a thiol group of Component (E) is not limited, and for example, pentaerythritol tetrakis(3-mercaptobutyrate), 1,4-bis(3-mercaptobutyryloxy) butane, 1,3,5-tris(2-(3-sulfanylbutanoyloxy)ethyl)-1,3,5-triazinane-2,4,6-trione, and the like can be used. Among these, pentaerythritol tetrakis(3-mercaptobutyrate) and 1,4-bis(3-mercaptobutyryloxy) butane, which are excellent in reactivity, can be used. Alternatively, two or more of these compounds having a thiol group may be used in combination.

In the photocurable composition according to the embodiment of the present invention, in a case where the entirety (Component (A)+Component (B)+Component (C)+Component (D)+Component (E)) is set to 100 parts by mass, Component (E) is included in a range of 26 parts by mass or more and less than 80 parts by mass, particularly in a range of 28 parts by mass or more and 79 parts by mass or less, more particularly in a range of 28 parts by mass or more and 78 parts by mass or less, further more particularly in a range of 28 parts by mass or more and 75 parts by mass or less, and even more particularly in a range of 28 parts by mass or more and 71 parts by mass or less, or more particularly in a range of 45.7 parts by mass or more and 54.7 parts by mass or less. That is, a ratio of a total mass of Component (A), Component (B), Component (C), and Component (D) to the mass of Component (E) is (Component (A)+Component (B)+Component (C)+Component (D)):Component (E)=74:26 to 20:80, particularly 72:28 to 21:79, more particularly 72:28 to 22:78, further more particularly 72:28 to 25:75, even further more particularly 72:28 to 29:71, or more particularly 54.3:45.7 to 45.3:54.7. In the photocurable composition, as the mass ratio satisfies the range of 74:26 to 20:80, it is possible to achieve both excellent curing reactivity and high storage stability. In a case where the mass ratio is out of the range of 74:26 to 20:80, one of the four components and Component (E) becomes excessive, and as a result, any component that has not reacted during the curing reaction by light irradiation may remain, and thus poor curing of the photocurable composition can be caused.

In particular, in the photocurable composition according to the embodiment of the present invention, (Component (A)+Component (B)+Component (C)+Component (D)):Component (E)=54.3:45.7 to 45.3:54.7, and in a case where the entirety (Component (A)+Component (B)+Component (C)+Component (D)+Component (E)) is set to 100 parts by mass, in a case where Component (B) is included in a range of 5 parts by mass or more and 10 parts by mass or less, Component (C) is included in a range of 5 parts by mass or more and 10 parts by mass or less, and Component (D) is included in a range of 0.2 parts by mass or more and 0.5 parts by mass or less, it is possible to achieve both extremely excellent curing reactivity and high storage stability.

[Other Components]

In the photocurable composition according to the embodiment of the present invention, in addition to Component (A), Component (B), Component (C), Component (D), and Component (E), in a range not impairing delayed curability and storage stability, any optional component known to those skilled in the art, such as various other resins and additives, may be blended.

The photocurable composition according to the embodiment of the present invention can be prepared by weighing Component (A), Component (B), Component (C), Component (D), and Component (E) so as to be within the above-described mass ratio, adding other component depending on the necessity, and mixing each component sufficiently. The mixing method is not particularly limited. For example, mixing may be performed using a mixing device known to those skilled in the art.

The photocurable composition according to the embodiment of the present invention has delayed curability and does not cure immediately after light irradiation. Therefore, for example, a sufficient working time can be ensured even after irradiation with ultraviolet rays. Therefore, for example, the photocurable composition can be used as a delayed curing adhesive.

<Liquid Crystal Display Device>

The liquid crystal display device according to the embodiment of the present invention includes a cured product of the photocurable composition according to the above-described embodiment.

FIG. 1 is a schematic cross-sectional view of a liquid crystal display device according to an embodiment of the present invention. As shown in FIG. 1, liquid crystal display device 10 includes cured product 1 of the photocurable composition in the above-described embodiment, cover panel 2, housing 3, display panel 4, and circuit board 5. The photocurable composition can be used as a delayed curing adhesive that can ensure sufficient work time as described above. Therefore, for example, liquid crystal display device 10 can be manufactured by filling the photocurable composition on a surface opposite to a surface on which circuit board 5 of display panel 4 installed inside housing 3 is installed, attaching cover panel 2, and then appropriately performing light irradiation (for example, ultraviolet ray irradiation). Since cured product 1 of the photocurable composition has high transparency, liquid crystal display device 10 manufactured in this way has high visibility.

In addition, the photocurable composition according to the above-described embodiment does not inhibit the reaction due to oxygen in the air during the photocuring reaction, and the curing reaction proceeds to a portion separated from a portion irradiated with light (for example, ultraviolet rays). Therefore, for example, liquid crystal display device 10 shown in FIG. 1 can be cured up to a portion where light is not irradiated.

EXAMPLES

Hereinafter, the present invention will be described in more detail with reference to Examples. The present invention is not limited to the following examples. In addition, unless otherwise specified, parts and % in Examples are based on mass.

<Preparation of Photocurable Composition and Preparation of Test Piece>

Regarding the photocurable compositions of Examples 1 to 5 and Comparative Examples 1 to 3 in which the blending amounts of Component (A), Component (B), Component (C), Component (D), and Component (E) were changed, curing reactivity (curability), storage stability, and optical properties of each photocurable composition were evaluated and determined. The blending amounts of each of components in each Example and each Comparative Example are shown in Tables 1 and 2 below, together with the determination results.

In each Example and each Comparative Example, dicyclopentadiene diglycidyl ether (manufactured by ADEKA, EP-4088S, epoxy equivalent 170 (g/eq)), which is an alicyclic epoxy resin, was used as Component (A), trimethylolpropane triacrylate (Aronix M-309, manufactured by Toa Synthetic Co., Ltd.) was used as Component (B), hexamethylene diisocyanate (Duranate D201, manufactured by Asahi Kasei Co., Ltd.) was used as Component (C), 1,2-disopropyl-3-[bis(dimethylamino) methylene] guanidium 2-(3-benzoylphenyl) propinate (WPBG-266, manufactured by Fujifilm Wako Pure Chemical Industries, Ltd.) was used as Component (D), and pentaerythritol tetrakis(3-mercaptobutyrate) (PE-1, manufactured by Showa Denko Co., Ltd.) was used as Component (E).

First, in each Example and each Comparative Example, Component (A), Component (B), and Component (C) were mixed at the blending amounts (g) shown in Tables 1 and 2 below, and powdered Component (D) was added therein. Such a mixture was sufficiently mixed with a rotating/revolving defoaming stirrer to dissolve it. Subsequently, Component (E) was added to the mixture, and the mixture was sufficiently mixed again with the same stirrer to prepare each photocurable composition. As shown in Table 2 below, Component (B) and Component (C) were not included in Comparative Example 1 and Comparative Example 2.

Figure 2:
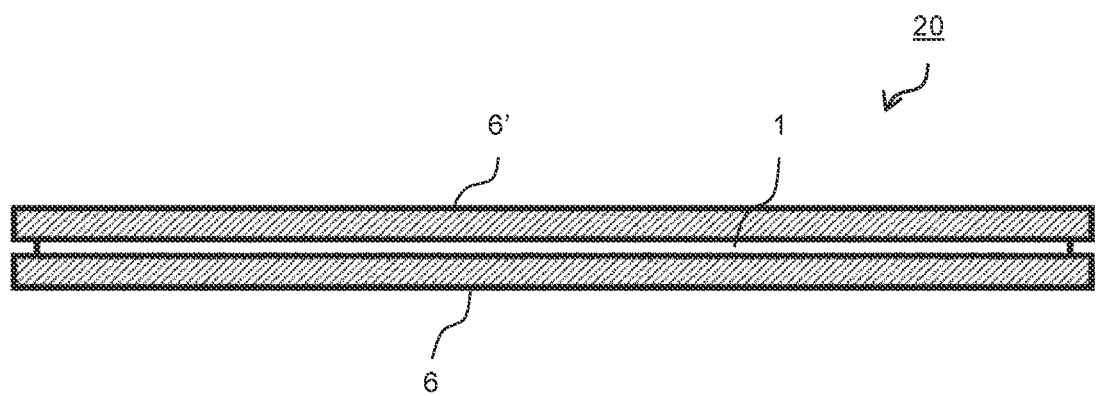
FIG. 2 is a schematic cross-sectional view of a test piece used in an embodiment of the present invention.

For each of the prepared photocurable compositions, a test piece was prepared in order to evaluate the curability and optical properties described later. FIG. 2 is a schematic cross-sectional view of the test piece used in the embodiment of the present invention. As shown in FIG. 2, test piece 20 includes cured product 1 of the photocurable composition, glass 6, and glass 6. Test piece 20 was prepared as follows. First, the photocurable compositions of each Example and each Comparative Example prepared as described above were applied onto glass 6, and glass 6' was adhered. Thereafter, light irradiation was performed on the adhered structure. The light irradiation was performed by irradiation with ultraviolet rays having an integrated light amount of 3000 mJ/cm2 using an ultraviolet LED irradiator of 254 nm. In this way, test piece 20 was prepared.

<Evaluation>

(Curability)

In order to perform evaluation regarding the curability of the photocurable compositions of each example and each comparative example, it was determined whether the photocurable composition was cured or not, after the light irradiation at the time of preparation of test piece 20 described above, after being left at room temperature for 30 minutes after the irradiation, after being left at room temperature for 1 hour after the irradiation, and after heating at 80° C. for 20 minutes depending on the necessity. In Tables 1 and 2 below, the determination results after being left for each time (or after heating) are shown as "cured" or "uncured". "Cured" refers to a state in which adhered glass 6 and glass 6' are not moved even when pressed with a finger. "Uncured" refers to a state in which adhered glass 6 and glass 6' are moved when pressed with a finger. Determination was made as "A" for those cured after being left at room temperature after light irradiation at the time of preparation, and "C" for uncured ones. However, those that have already been cured immediately after light irradiation at the time of preparation are marked with "C" because the curing reaction is too fast and practical use is difficult. Each determination result is shown in Tables 1 and 2 below.

(Storage Stability)

In order to evaluate the storage stability of the photocurable compositions of each example and each comparative example, each photocurable composition prepared as described above was transferred to a light-shielding container, and a viscosity change rate (%) after being stored at a refrigerating temperature (5° C.) for three days was measured. A viscometer (R-215, manufactured by Toki Sangyo Co., Ltd.) was used to measure the viscosity of the photocurable composition. In the determination of storage stability, those having a viscosity change rate of less than 10% are evaluated as "A", those having a viscosity change rate of 10% are evaluated as "B", and those having a viscosity change rate of 11% or more or those having no fluidity and not capable of being measured (for example, gelated ones) are evaluated as "C". Each determination result is shown in Tables 1 and 2 below.

(Optical Properties)

In order to evaluate the optical properties of the photocurable composition of each example and each comparative example, a total light transmittance (%) of the above-described test piece 20 was measured using a self-spectrophotometer (U-4000, manufactured by Hitachi High-Tech Science Co., Ltd.). In the determination, those having a total light transmittance of 95% or more were evaluated as "A", those having a total light transmittance of 90% or more and less than 95% were evaluated as "B", and those having a total light transmittance of less than 90% were evaluated as "C". Each determination result is shown in Tables 1 and 2 below.

(Comprehensive Determination)

As a comprehensive determination of the photocurable composition of each example and each comparative example, in each item of curability, storage stability, and optical properties, in a case where the determination of "A" is shown for all, the comprehensive determination was evaluated as "AA", in a case where there is a determination of "C" for any of each item, the comprehensive determination was evaluated as "C", and in other cases, the comprehensive determination was evaluated as "A".

TABLE 1

| Main composition | Component | Composition details | Content | Example 1 | Example 2 | Example 3 | Example 4 | Example 5 |
|---|---|---|---|---|---|---|---|---|
| Epoxy compound | Component (A) | Dicyclopentadiene diglycidyl ether | EP-4088S epoxy equivalent 70 (g/eq) | 7.80 | 8.00 | 7.00 | 13.14 | 3.00 |
| Acrylic ester compound | Component (B) | Trimethylolpropane triacrylate | Aronix M-309 | 2.00 | 1.40 | 1.00 | 0.60 | 1.37 |
| Isocyanate compound | Component (C) | Hexamethylene diisocyanate | Duranate D201 | 2.00 | 1.40 | 1.00 | 0.60 | 1.37 |
| Photobase generator | Component (D) | 1,2-dysopropyl-3-[bis(dimethylamino)methylene] guanidium 2-(3-benzoylphenyl) propinate | WPBG-266 | 0.06 | 0.06 | 0.06 | 0.06 | 0.06 |
| Thiol compound | Component (E) | Pentaerythritol tetrakis(3-mercaptobutyrate) | PE-1 | 8.14 | 9.14 | 10.94 | 5.60 | 14.2 |
| Total sum (mass/g) | | | | 20 | 20 | 20 | 20 | 20 |
| Ratio of Component (A) + Component (B) + Component (C) + Component (D) to Component (E) (* in a case where total sum of Component (A), Component (B), Component (C), Component (D), and Component (E) is 100 parts by mass) | | | Component (A) + Component (B) + Component (C) + Component (D) | 59.3 | 54.3 | 45.3 | 72.0 | 29.0 |
| | | | Component (E) | 40.7 | 45.7 | 54.7 | 28.0 | 71.0 |
| Parts by mass of Component (B) in a case where the entirety is 100 parts by mass | | | Component (B) | 10.0 | 7.00 | 5.00 | 3.00 | 6.85 |
| Parts by mass of Component (C) in a case where the entirety is 100 parts by mass | | | Component (C) | 10.0 | 7.00 | 5.00 | 3.00 | 6.85 |
| Parts by mass of Component (D) in a case where the entirety is 100 parts by mass | | | Component (D) | 0.3 | 0.3 | 0.3 | 0.3 | 0.3 |
| Curability | | | After UV irradiation | Uncured | Uncured | Uncured | Uncured | Uncured |
| | | | Left at room temperature for 30 minutes | Cured | Cured | Uncured | Uncured | Uncured |
| | | | Left at room temperature for 1 hour Heating at 80° C. for 20 minutes | | | Cured | Cured | Cured |
| | | | Determination (—) | A | A | A | A | A |

TABLE 1-continued

| Main composition | Component | Composition details | Content | Example 1 | Example 2 | Example 3 | Example 4 | Example 5 |
|---|---|---|---|---|---|---|---|---|
| Storage stability | | | Viscosity change rate 3 days after refrigeration (5° C.) | 9% | 6% | 5% | 5% | 10% |
| | | | Determination (—) | A | A | A | A | B |
| Optical properties | | | Total light transmittance | 91% | 95% | 97% | 90% | 92% |
| | | | Determination (—) | B | A | A | B | A |
| Comprehensive determination | | | Determination (—) | A | AA | AA | A | A |

TABLE 2

| Main composition | Component | Composition details | Content | Comparative Example 1 | Comparative Example 2 | Comparative Example 3 |
|---|---|---|---|---|---|---|
| Epoxy compound | Component (A) | Dicyclopentadiene diglycidyl ether | EP-4088S epoxy equivalent 170 (g/eq) | 11.74 | 11.20 | 4.80 |
| Acrylic ester compound | Component (B) | Trimethylolpropane triacrylate | Aronix M-309 | | | 5.00 |
| Isocyanate compound | Component (C) | Hexamethylene diisocyanate | Duranate D201 | | | 5.00 |
| Photobase generator | Component (D) | 1,2-dysopropyl-3-[bis(dimethylamino)methylene] guanidium 2-(3-benzoylphenyl) propinate | WPBG-266 | 0.06 | 0.60 | 0.06 |
| Thiol compound | Component (E) | Pentaerythritol tetrakis(3-mercaptobutyrate) | PE-1 | 8.20 | 8.20 | 5.14 |
| Total sum (mass/g) | | | | 20 | 20 | 20 |
| Ratio of Component (A) + Component (B) + Component (C) + Component (D) to Component (E) (* a case where total sum of Component (A), Component (B), Component (C), Component (D), and Component (E) is 100 parts by mass) | | | Component (A) + Component (B) + Component (C) + Component (D) | 59.0 | 59.0 | 74.3 |
| | | | Component (E) | 41.0 | 41.0 | 25.7 |
| Parts by mass of Component (B) in a case where the entirety is 100 parts by mass | | | Component (B) | | | 25.0 |
| Parts by mass of Component (C) in a case where the entirety is 100 parts by mass | | | Component (C) | | | 25.0 |
| Parts by mass of Component (D) in a case where the entirety is 100 parts by mass | | | Component (D) | 0.3 | 3.0 | 0.3 |
| Curability | | | After UV irradiation | Uncured | Cured | Cured |
| | | | Left at room temperature for 30 minutes | Uncured | | |
| | | | Left at room temperature for 1 hour | Uncured | | |
| | | | Heating at 80° C. for 20 minutes | Uncured | | |
| | | | Determination (—) | C | C | C |
| Storage stability | | | Viscosity change rate 3 days after refrigeration (5° C.) | 3% | 80% | Gelated |
| | | | Determination (—) | A | C | C |
| Optical properties | | | Total light transmittance | — | — | — |
| | | | Determination (—) | — | — | — |
| Comprehensive determination | | | Determination (—) | C | C | C |

As shown in Tables 1 and 2 above, regarding the evaluation of curability, in each of Examples 1 to 5, there was a determination of "A", whereas in both of Comparative Examples 1 and 2 in which Component (B) and Component (C) are not included, there was a determination of "C". This shows that Comparative Example 1 includes the same amount of Component (D) as those of Examples 1 to 5, but the reactivity is low only with Components (A) and (E), and thus it is not sufficient enough to cure the photocurable composition. In Comparative Example 2, it is considered that 10 times the amount of Component (D) as in Examples 1 to 5 is required to cure only Components (A) and (E), but it is shown that curing is performed immediately after light irradiation at the time of preparation and delayed curability cannot be obtained. In addition, in Comparative Example 2, it was obvious that the storage stability was deteriorated since the blending amount of Component (D) was large. In Comparative Example 3, it was obvious that the blending amount of Component (D) was the same as those of Examples 1 to 5, but since Components (B) and (C) having high reactivity were included in excess amounts, not only curing was performed immediately after light irradiation at the time of preparation but also the storage stability was significantly deteriorated.

Considering the results of each of the above examples and comparative examples, in a case where the ratio of the total mass of the Component (A), Component (B), Component (C), and Component (D) to the mass of Component (E) is within a range of 72 (Component (A)+Component (B)+Component (C)+Component (D): 28 (Component (E)) to 29 (Component (A)+Component (B)+Component (C)+Component (D)): 71 (Component (E)), it can be recognized that it is possible to reliably obtain a photocurable composition excellent in curability, storage reactivity, and optical properties. In particular, it was obvious that in a case where the entirety (Component (A)+Component (B)+Component (C)+Component (D)+Component (E)) is set to 100 parts by mass, in a case where Component (B) is 3 parts by mass or more and 10 parts by mass or less, Component (C) is 3 parts by mass or more and 10 parts by mass or less, and Component (D) is about 0.3 parts by mass, it is possible to further reliably obtain a photocurable composition excellent in curability, storage reactivity, and optical properties.

INDUSTRIAL APPLICABILITY

The photocurable composition of the present invention has excellent curing reactivity and high storage stability. In addition, the photocurable composition can be used as an adhesive for adhering a cover panel and a display panel when manufacturing a liquid crystal display device. A liquid crystal display device provided with a cured product of such a photocurable composition can improve optical properties, specifically, visibility. Alternatively, the photocurable composition of the present invention has delayed curability and is cured at room temperature by irradiation with light such as ultraviolet rays, and thus the photocurable composition can be used as an adhesive for assembling a module and the like which has low heat resistance and in which light irradiation after assembly due to the complex shape is difficult.

REFERENCE MARKS IN THE DRAWINGS

1 Cured product of photocurable composition
2 Cover panel
3 Housing
4 Display panel
5 Circuit board
6, 6' Glass
10 Liquid crystal display device
20 Test piece

The invention claimed is:

1. A photocurable composition comprising:
component (A): epoxy compound;
component (B): acrylic ester compound;
component (C): isocyanate compound;
component (D): photobase generator; and
component (E): compound having a thiol group,
wherein the component (A) has two or more epoxy groups in one molecule, the component (B) has two or more acryloyl groups in one molecule, the component (C) has two or more isocyanate groups in one molecule, and the component (E) has two or more thiol groups in one molecule,
wherein when a total sum of the component (A), the component (B), the component (C), the component (D), and the component (E) is set to 100 parts by mass, the Component (B) is included in a range of 5 parts by mass or more and 10 parts by mass or less, the component (C) is included in a range of 5 parts by mass or more and 10 parts by mass or less, and the Component (D) is included in a range of 0.2 parts by mass or more and 0.5 parts by mass or less, and
a ratio of a total mass of the component (A), the component (B), the component (C), and the component (D), to a mass of the component (E) is (the component (A)+the component (B)+the component (C)+the component (D)): the component (E)=54.3:45.7 to 45.3:54.7,
and wherein the photocurable composition has a total light transmittance of 95% or more, a viscosity change rate of less than 10% after being stored at a low temperature of 5° C. for three days in a light-shielding container, and does not cure immediately after ultraviolet light irradiation having an integrated light amount of 3,000 mJ/cm$^2$, but has a delayed heat-curing that, while initiated by the ultraviolet light irradiation, is controlled by temperature.

2. The photocurable composition of claim 1, wherein the component (B) includes at least one selected from the group consisting of acrylic ester compounds each having one or more of an aliphatic structure and an aromatic structure in a side chain of an ester.

3. The photocurable composition of claim 1, wherein the component (C) includes at least one selected from the group consisting of an isocyanate compound having an aliphatic structure in a main chain, an isocyanate compound having an aromatic structure in a main chain, and an isocyanate compound having an aliphatic structure and an aromatic structure in a main chain.

4. The photocurable composition of claim 1, wherein the component (D) includes at least one selected from the group consisting of a carboxylate having any one of a xanthone skeleton or a ketoprofen skeleton, a salt containing a borate anion, a quaternary ammonium salt, and a carbamate compound.

5. A liquid crystal display device comprising a cured product of the photocurable composition of claim 1.

* * * * *